Jan. 31, 1950  P. D. NELSON  2,496,016
CONCRETE STAVE MAKING MACHINE
Filed Feb. 25, 1947  8 Sheets-Sheet 1

INVENTOR.
PAUL D. NELSON
BY
Munn, Liddy & Glaccum
ATTORNEYS.

INVENTOR.
PAUL D. NELSON.

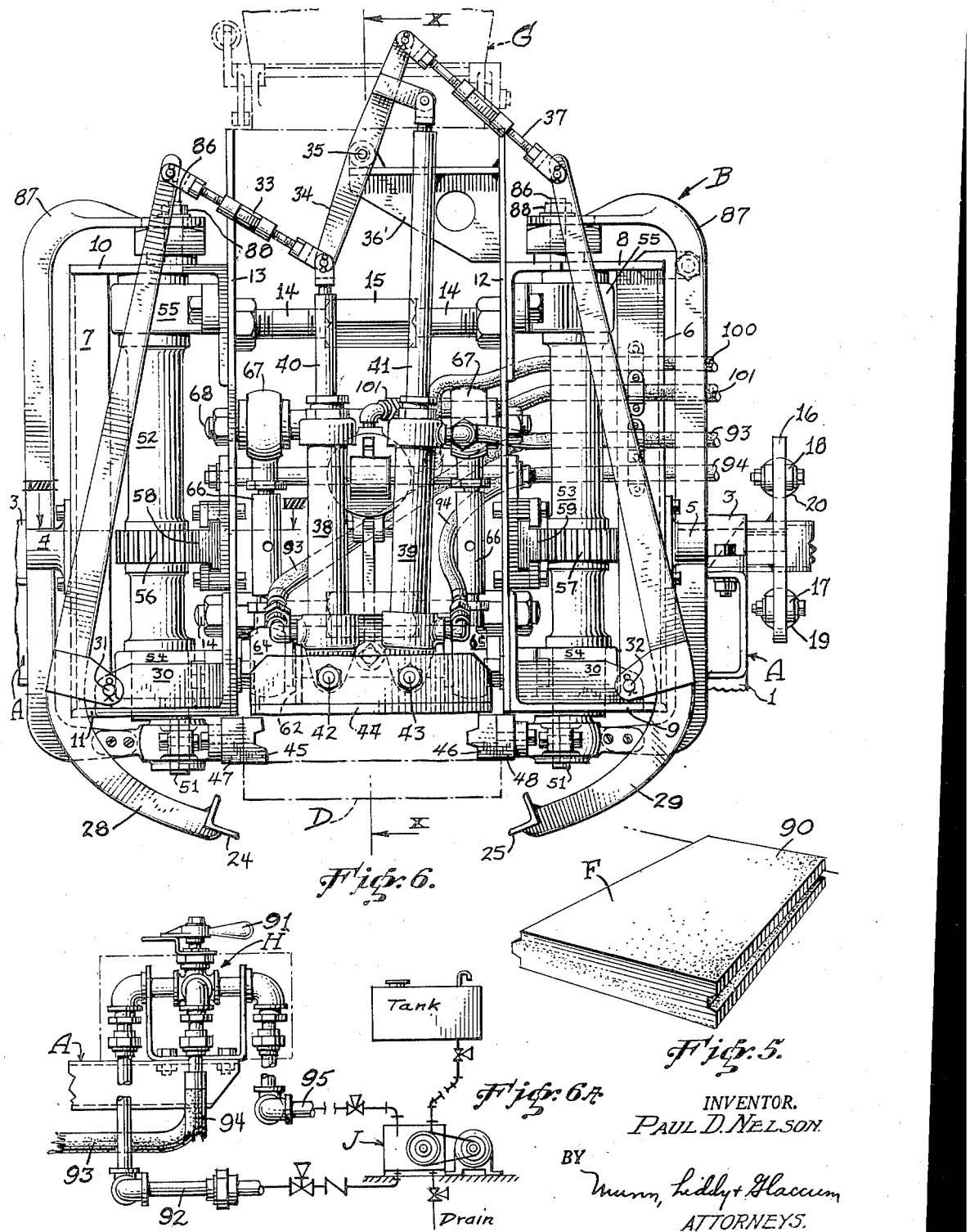

INVENTOR.
PAUL D. NELSON.
BY
Munn, Liddy & Glaccum
ATTORNEYS.

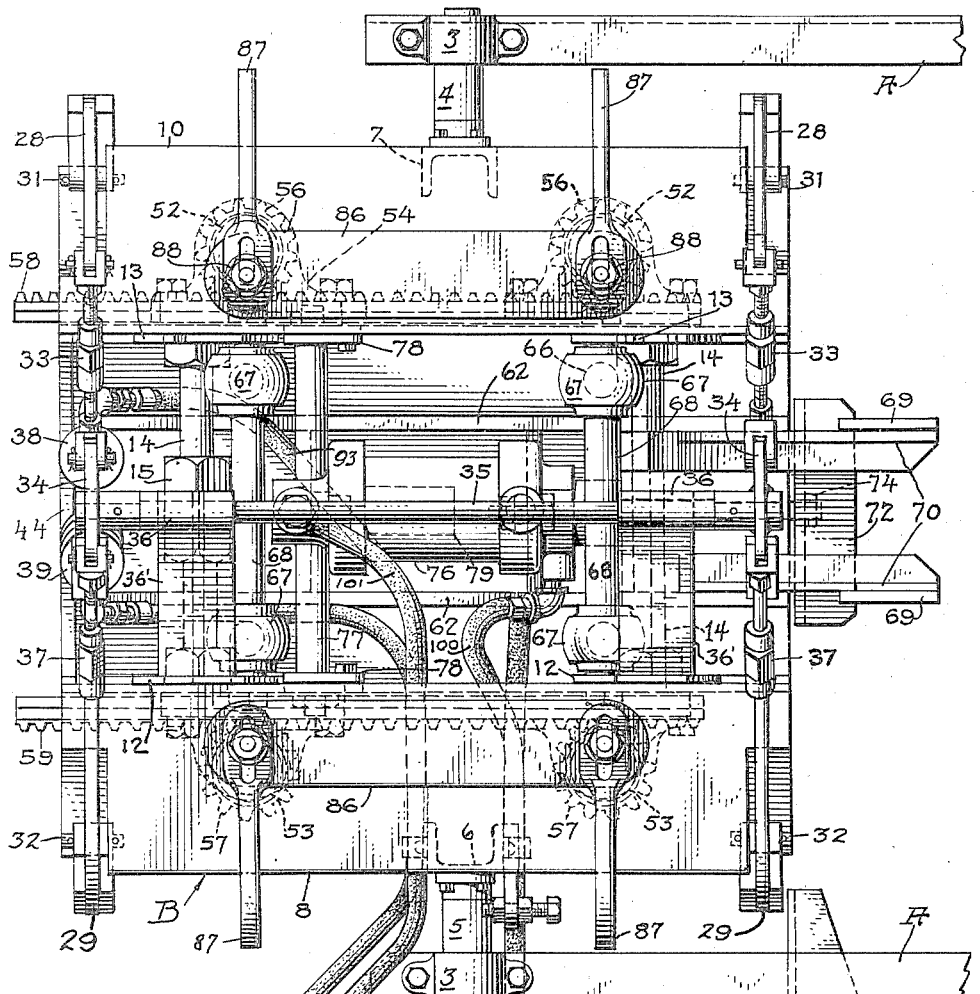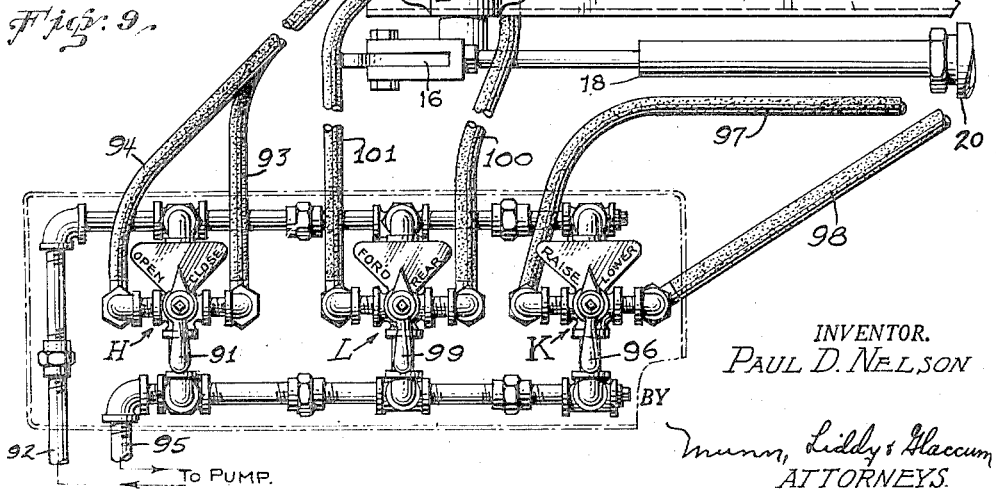

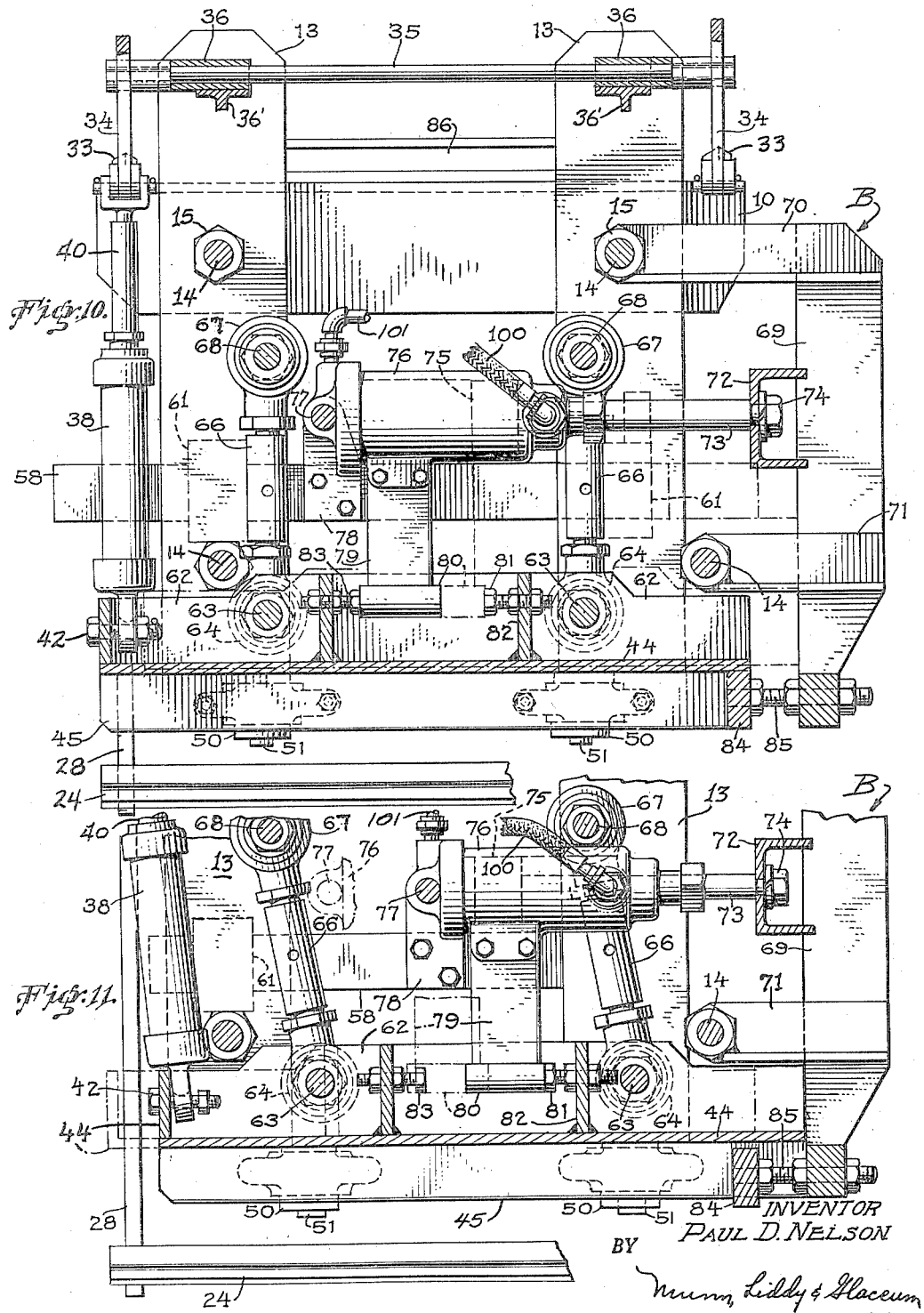

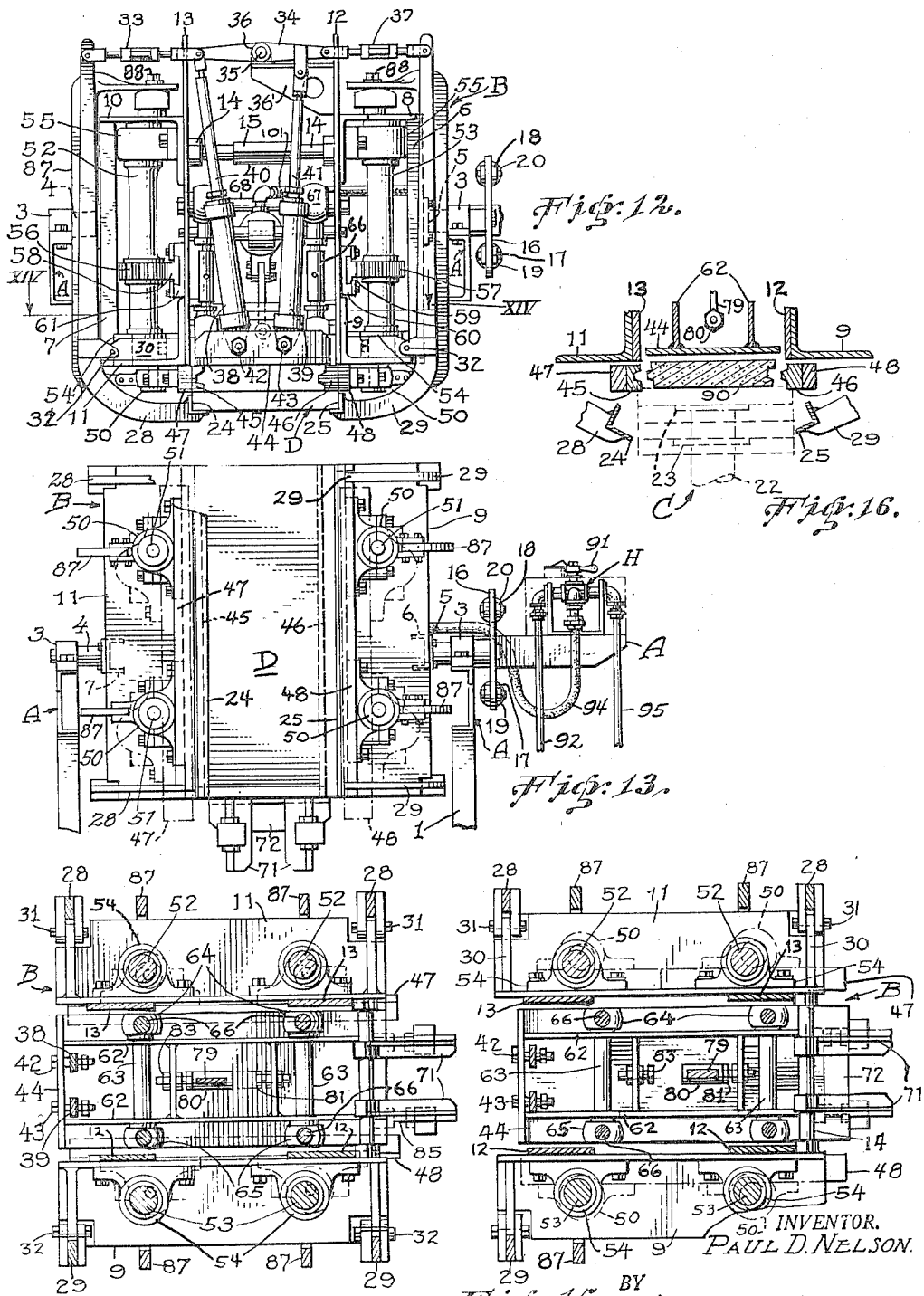

Jan. 31, 1950 P. D. NELSON 2,496,016
CONCRETE STAVE MAKING MACHINE
Filed Feb. 25, 1947 8 Sheets-Sheet 8

INVENTOR.
PAUL D. NELSON
BY
Munn, Liddy & Haccum
ATTORNEYS.

Patented Jan. 31, 1950

2,496,016

UNITED STATES PATENT OFFICE 2,496,016

CONCRETE STAVE MAKING MACHINE

Paul D. Nelson, Turlock, Calif.

Application February 25, 1947, Serial No. 730,703

4 Claims. (Cl. 25—42)

An object of my invention is to provide a stave making machine which is an improvement over the patent of A. H. Nelson on a Concrete stave making machine, No. 1,808,860, issued June 9, 1931. In the patent the mold is opened and closed by manual means whereas in the present invention the mold side plates are opened and closed by hydraulic means. It is possible to control the opening and closing of the side plates by a timing mechanism so that the various operations will follow in proper sequence. I also provide novel means for feeding one pallet board at a time to the machine, the pallet board constituting one side of the mold during the molding operation.

A further object of my invention is to provide a device of the type described in which the face or top plate and the side plates of the mold give a troweling action to the molded product, such as a concrete stave, during the opening of the mold so that the surfaces of the product will be smooth and a better concrete stave formed. The angle of the side plates may be changed so that concrete staves with sides that extend at the desired angles may be formed. A change of the angle of the sides determines the diameter of the silo which is to be built. It is possible to change the distance between the mold side plate so that the width of the concrete stave can be altered.

Other objects and advantages will appear in the following specification, and the novel features of the device will be particularly pointed out in the appended claims.

My invention is illustrated in the accompanying drawings forming a part of this application, in which:

Figure 5 is a perspective view of a concrete stave made with my machine;

Figure 6 is a front elevation of the machine with the mold shown in open position;

Figure 6A is a continuation of Figure 6 and illustrates the valve mechanism which would appear on the right hand side of Figure 6;

Figure 9 is a top plan view of the machine, showing the control valves;

Figure 10 is a section taken along the line X—X of Figure 6;

Figure 11 is a view similar to Figure 10, but shows the parts in a different position;

Figure 12 is a front elevation of the machine on a smaller scale, showing the pallet board retaining member in closed position;

Figure 13 shows the machine tilted into a vertical position for receiving the cementitious material;

Figure 14 is a horizontal section taken along the line XIV—XIV of Figure 12;

Figure 15 is a view similar to Figure 14, but shows the parts in the mold-opened position;

Figure 16 is a schematic transverse section showing the face plate and side plates of the mold in open position;

While I have shown only the preferred form of my invention, it should be understood that various changes or modifications may be made within the scope of the appended claims without departing from the spirit and scope of the invention.

In carrying out my invention, I will describe the supporting frame and then the mold carrying frame which is rotatably mounted in the supporting frame. I will then set forth the pallet board feeding means, the pallet board gripping jaws and then the mechanism for moving the mold side plates and the face plate into open position. The angle adjusting arms for the side plates will next be set forth and this will be followed by the operation of the entire machine. All of the above features will be mentioned in the order given under appropriate headings.

*Supporting frame*

Figure 1:
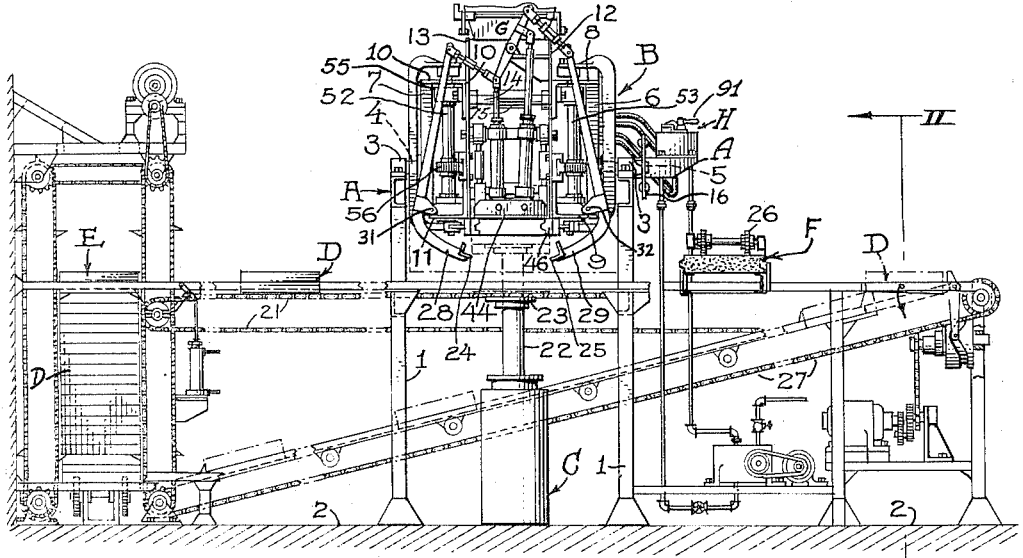
Figure 1 is a front elevation of the machine showing it in combination with pallet board feeding means.
Figure 3:
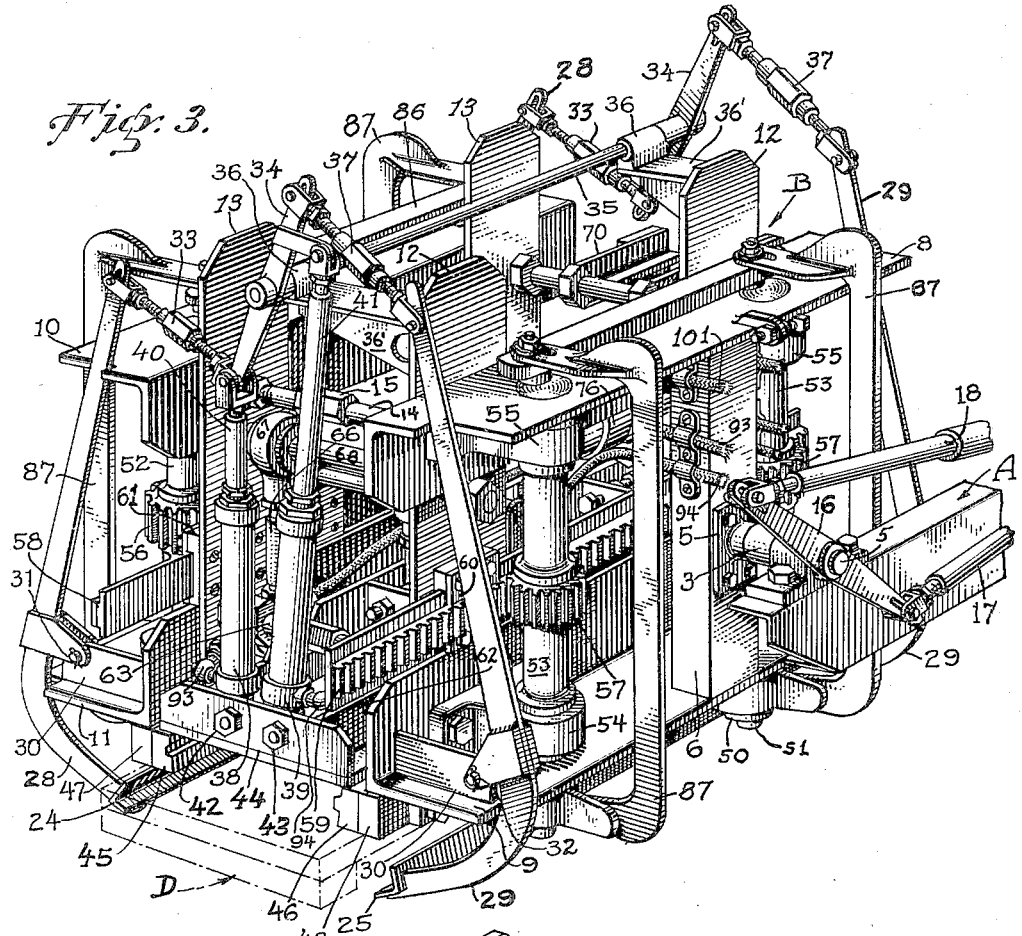
Figure 3 is a perspective view of the machine.

Reference to Figure 1 shows the supporting frame indicated generally at A as being mounted on uprights I so as to position the rotatable mold carrying frame indicated generally at B at a sufficient height above a pallet board feeding means indicated at C. If desired, the cylinder may be embedded so that its top will be flush with the ground surface 2. I do not wish to be confined to any particular shape of supporting frame A nor to its exact position with respect to the ground 2. The frame carries spaced bearings 3 for rotatably receiving trunnions 4 and 5, see Figure 12. Figure 3 illustrates how the trunnion 5 is secured to an upright 6 of the mold carrying frame B. In like manner the trunnion 4 is secured to an upright 7, see Figure 12.

The two uprights 6 and 7 have angle members welded or otherwise secured thereto. The upright 6 has upper and lower angle members 8 and 9 attached thereto, while the upright 7 has upper and lower angle members 10 and 11 secured thereto. In addition, the vertical portions of the angle members have vertically-extending plates welded in place. Again referring to Figures 3 and 12, it will be seen that vertical plates 12 are secured to the vertical portion of the angles 8 and 9, while vertical plates 13 are secured to the vertical portions of the angles 10 and 11.

The plates 12 are spaced from the plates 13 by transverse rods 14 and these rods are threaded at their adjacent ends and receive threaded collars 15 for connecting the rod sections together. A turning of the collars will move the plates 12 and 13 toward or away from each other. In this way the width of the mold, which will be hereafter described in detail, can be changed.

The entire frame B can be swung as a unit about the trunnions 4 and 5 and in Figure 3 I show a hydraulic control for swinging the frame. The trunnion 5 extends through the bearing 3 and has a lever 16 rigidly secured thereto. Piston rods 17 and 18 are connected to the ends of the lever 16 and these rods extend into hydraulic cylinders 19 and 20, see Figure 7. When fluid is fed into the cylinder 19, it will cause the piston rod 17 to act upon the lever 16 for swinging the mold carrying frame B from the position shown in Figure 7 into a vertical position shown in Figure 13 and also in Figure 2. The frame B can be returned to its normal horizontal position by admitting fluid under pressure into the cylinder 20 and this will cause the piston rod 18 to swing the lever 16 back into the full line position shown in Figure 7. The valve control means for admitting fluid into either the cylinder 19 or the cylinder 20 will be set forth when the operation of the entire machine is described.

Pallet board feeding means

Figure 2:
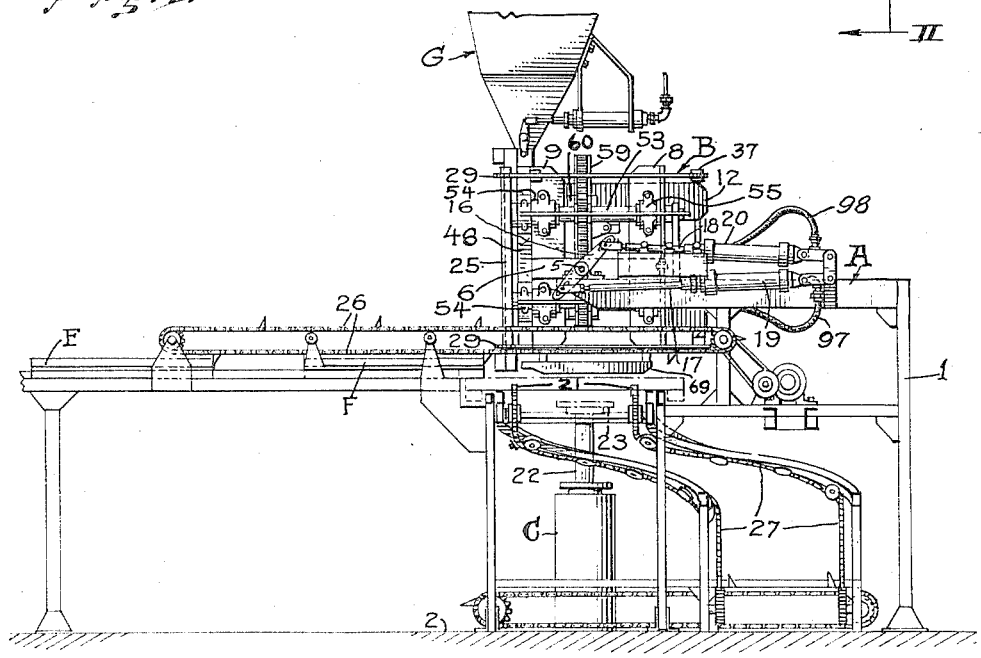
Figure 2 is a vertical section taken along the line II—II of Figure 1.

In Figures 1 and 2 I show one method of feeding pallet boards D to the machine and for removing the boards from the machine. It is obvious that different mechanisms may be used and therefore I do not wish to be confined to the particular one illustrated. A horizontal conveyor chain 21 removes one pallet board at a time from a magazine indicated generally at E that holds a quantity of the boards. The conveyor chain 21 is stepwise advanced by any desired mechanism until the pallet board D is positioned directly under the machine B. At this time a piston rod 22, which is carried by the cylinder of the pallet board feeding means C, raises a platform 23 for moving the board D upwardly into a position where it will be received by side jaws 24 and 25 of the mold carrying frame B. The method for actuating the side jaws will be hereinafter described.

After the molding operation is completed, the piston 22 will again be raised to receive the board D and a releasing of the jaws 24 and 25 will permit the board with the concrete stave thereon, to be lowered by the platform 23 back on to the conveyor 21. The conveyor 21 then advances the board D to a transverse conveyor indicated at 26 and this conveyor will remove the concrete stave F from the board. In Figure 2 the conveyor 26 is shown as moving the completed staves F from the pallet board D.

A return gravity conveyor 27 will receive the pallet board D and will carry it back to the magazine E where the board will again be used in its proper turn. Of course, where the concrete stave has not set enough to be removed from the pallet board immediately after being molded, the pallet board with the stave may be stacked for a period of time to permit the stave to set. When this is accomplished, the stave may be removed from the board and then allowed to cure for a number of days, whereupon the stave will be ready for use. It is for this reason I do not wish to be confined to a mechanism which will remove the stave from the board immediately after the molding operation. A valve mechanism, not shown, may be used for raising and lowering the piston rod 22 and the platform 23 in proper sequence for lifting a pallet board into the machine and then for receiving the board after the molding operation.

Pallet board gripping jaws

The pallet board gripping jaws are in the shape of angle irons, see Figure 3, that extend throughout the length of the machine. The jaw 24 is supported by two levers 28 and the jaw 25 is supported by two levers 29. The lower angle plates 9 and 11 carry brackets 30 to which the levers 28 and 29 are pivotally secured at 31 and 32, respectively.

The tops of the levers 28 are connected by turnbuckles 33 to levers 34 which in turn are mounted on a longitudinally-extending shaft 35. The shaft is journalled in bearings 36, which in turn are supported by brackets 36' that are carried by the vertical plates 12. The upper ends of the other pair of levers 29 are connected by turnbuckles 37 to the other ends of the levers 34. When the jaws 24 and 25 are opened preparatory to receiving a pallet board B, the levers 34 are in the position shown in Figure 3. When a pallet board is gripped by the jaws 24 and 25 the levers 34 are swung into a horizontal position, see Figure 12, and the turnbuckles 33 and 37 are also disposed in a horizontal position and in alignment with the levers. It will be seen that any lateral strain of the pallet board B to open the jaws 24 and 25 is offset by the levers 34 and the turnbuckles being disposed in alignment with each other, which in effect is a dead center position.

The means for moving the jaws 24 and 25 toward or away from each other comprises two hydraulic cylinders 38 and 39. A piston rod 40 extends from the cylinder 38 and is connected to one end of the lever 34, which is disposed at the front of the machine. A piston rod 41 extends from the other cylinder 39 and is connected to the other end of the same lever 34. When fluid under pressure is fed into the lower end of the cylinder 38 by a means hereinafter described, the piston rod 40 is moved upwardly to swing the lever 34 and the jaws 24 and 25 into the position shown in Figure 12. When it is desired to free the pallet board B from the jaws, fluid under pressure is admitted to the lower end of the cylinder 39 and this will cause the piston rod 41 to raise and to swing the lever 34 in a counter-clockwise direction when looking at Figures 3 and 12. The cylinders 38 and 39 are pivoted at 42 and 43 to the upper face plate 44 of the mold. The means for supporting the face plate and the side plates 45 and 46 of the mold will now be described.

Mold side members

Figure 17:
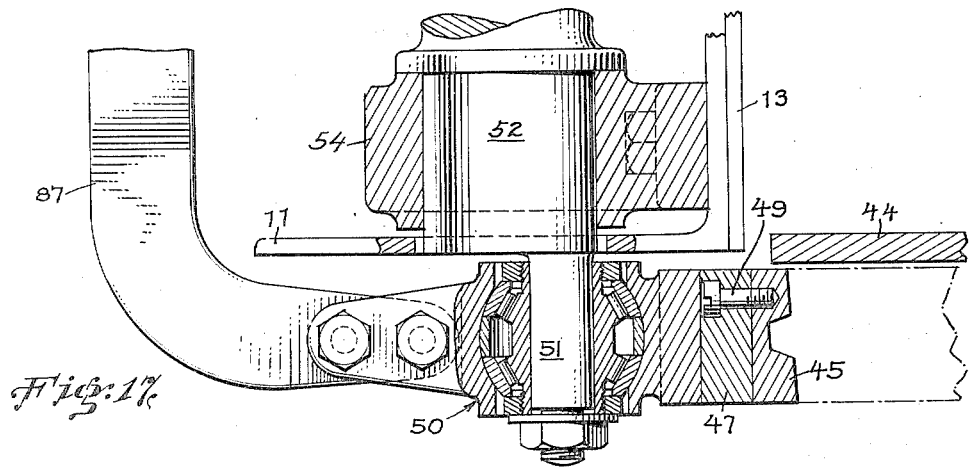
Figure 17 is an enlarged sectional view of one of the self-aligning bearings used in supporting the side plates.

The mold side plates 45 and 46 are carried by elongated supports 47 and 48 and the support 47 is shown in an enlarged section in Figure 17. Cap screws 49 connect the side members to the supports, and the supports in turn carry self-aligning bearings, indicated generally at 50. One of the bearings is shown in cross section in Figure 17. The bearing housing is carried by the support 47, while the interior of the bearing is mounted on an eccentric stub 51 that depends from a shaft 52.

Figure 7:
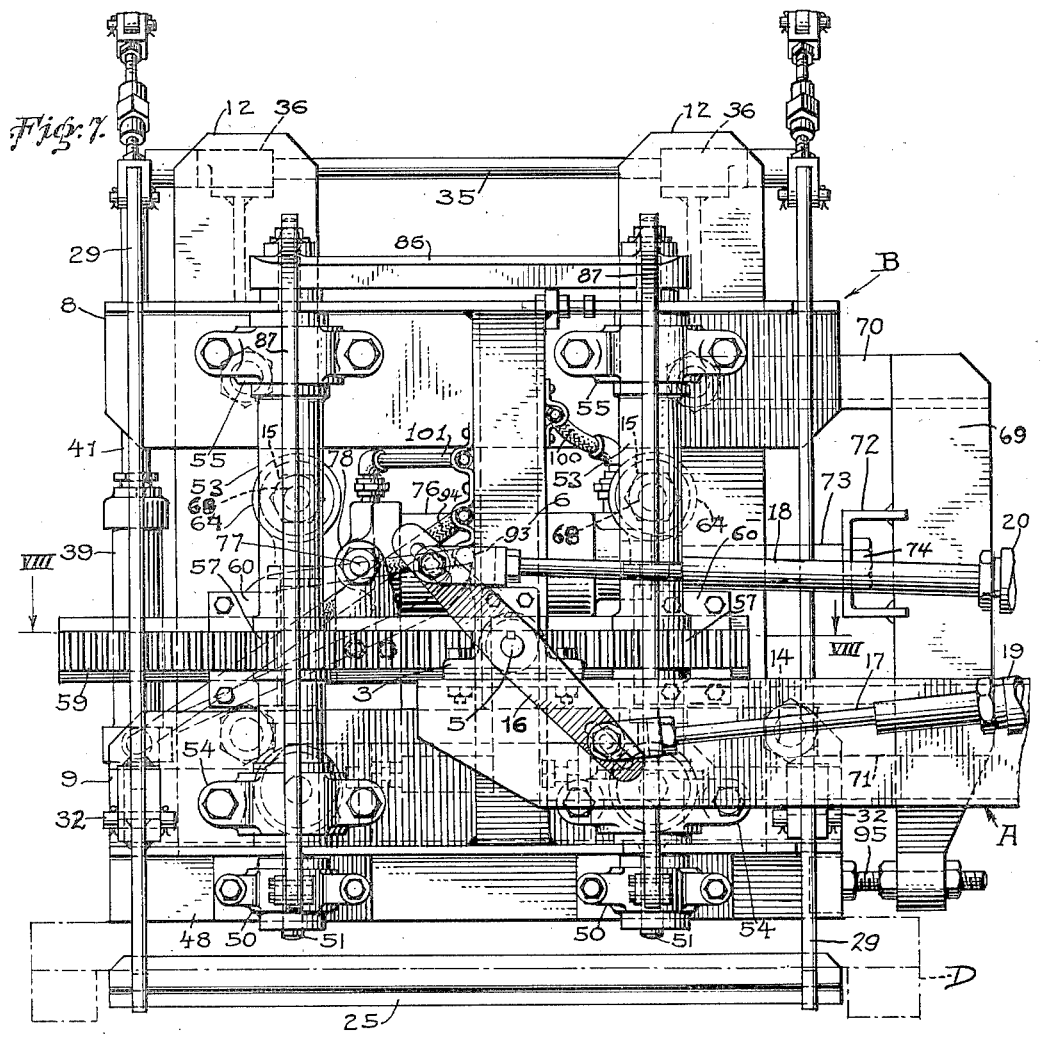
Figure 7 is a side elevation of the machine, omitting the control valves.

I provide two shafts 52 on one side of the machine and two similar shafts 53 on the other side, see Figures 14 and 15. All of the shafts carry the eccentric stub portions 51 and the self-aligning bearings 50. Figures 7 and 12 illustrate how the shafts 52 and 53 are received in lower and upper bearings 54 and 55, respectively, and these are carried by the angle members 9—11 and 8—10. The shafts 52 and 53 carry pinions 56 and 57, with the pinions 56 meshing with a rack 58 and the pinions 57 meshing with the rack 59. In Figure 7 I show the rack 59 being slidably supported by brackets 60, which are attached to the vertical plates 12. In like manner the rack 58 is slidably supported by brackets 61 that are carried by the plates 13.

Figure 8:
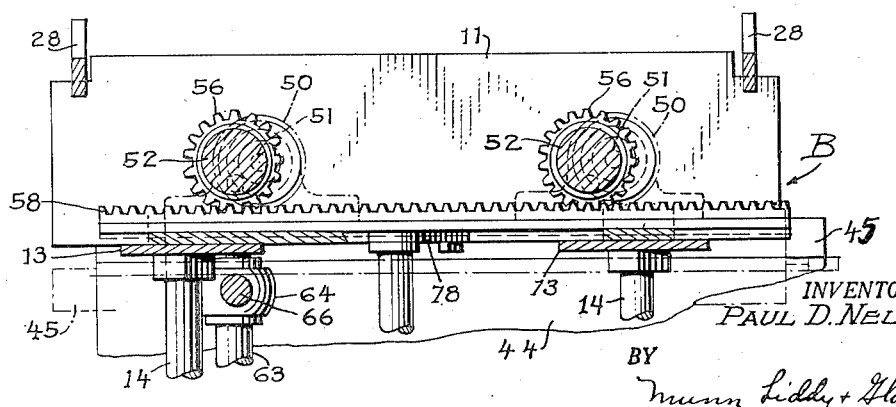
Figure 8 is a section along the line VIII—VIII of Figure 6, showing only one operating side of the machine.

It will be seen from this construction that a longitudinal movement of the racks 58 and 59 will rotate the pinions and cause the shafts 52 and 53 to rotate through approximately an arc of 180°. This movement is illustrated in Figures 14 and 15 and shows how the self-aligning bearings 50 on one side of the machine are moved away from those on the other side of the machine during this rotative movement. The side plate 45 will be moved from the dotted line position shown in Figure 8 into the full line position shown in the same figure. The side plates will be moved longitudinally and also through arcs having a radius equal to the distance from the centers of the eccentrics 51 to the centers of the shafts 52 and 53. The side plates will therefore give a trowelling action to the sides of the molded stave as they are moved into open position. This action will be explained more in detail when the operation of the machine is described.

Top mold face plate

The top face plate 44 of the mold parallels the pallet board B when the latter is in position. Figures 10 and 11 clearly show the face plate provided with elongated ribs 62 and these ribs have transversely extending shafts 63 mounted therein. The shafts extend beyond the ribs 62, see Figures 14 and 15 and have pairs of bearings 64 and 65 mounted thereon. The bearings 64 have swingable and adjustable rods 66 extending upwardly therefrom to supporting bearings 67. The bearings 67 are rockably mounted on upper transverse rods 68. The rods or shafts 68 extend into the vertical plates 12 and 13 and are supported thereby.

It will be seen from this construction that the top face plate 44 of the mold is supported on four parallel rods 66 that are free to swing about the two upper shafts 68 as pivots. The movement of the face plate to the rear, i. e., to the right-hand side in Figures 10 and 11 will cause the face plate to be raised as shown in Figure 11. The face plate in moving rearwardly and upwardly gives a trowelling action to the upper face of the concrete stave and smoothes its surface.

Figure 4:
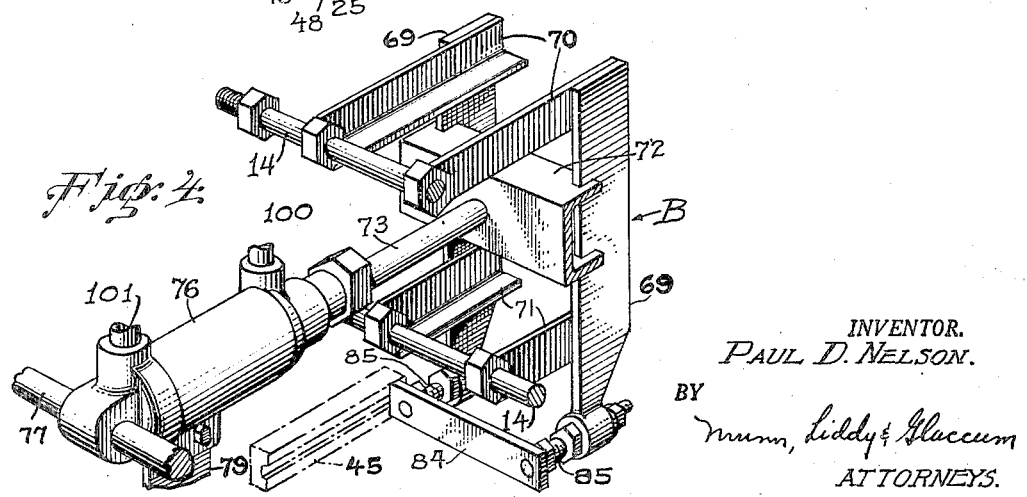
Figure 4 is a perspective view of the control cylinder which actuates the face plate and the side plates.

A mold end plate supporting frame 69 is secured to the frame B by upper and lower angle irons 70 and 71, see Figure 10, which in turn are connected to the transverse rods 14 that are disposed at the rear of the machine. A channel-shaped piston rod support 72, see Figure 4, is carried by the members 69 and a fixed piston rod 73 is secured to the channel by means of a nut 74 or other suitable fastening means. The rod 73 has a piston 75 thereon and this piston is slidably mounted in a master control cylinder 76. The free end of the cylinder is pivoted at 77 to a bracket 78 which in turn is connected to the gear racks 58 and 59, see Figure 10.

Figure 4 shows that two supporting members 69 are used and are arranged in parallel relation and the channel-shaped member 72 extends therebetween. The transverse rods 14 are also illustrated in this figure as supporting pairs of angle irons 70 and 71. The master cylinder 76 has conduits leading to and from the opposite ends of the cylinder for delivering fluid under pressure. When fluid is delivered to the end of the cylinder disposed adjacent to the piston rod 73, the piston 75 will stand still while the cylinder will be moved to the right in Figure 10. The movement of the cylinder to the right will cause the rod 77 through the brackets 78, to move the gear racks 58 and 59 to the right and this movement will cause the racks to rotate the gears and to move the side plates 45 and 46 away from each other and to open the sides of the mold while giving a troweling action to the stave.

A face plate moving member 79 depends from the master cylinder 75 and carries a head 80 at its lower end that will contact with a stop 81 after the member 79 is moved a predetermined distance. The stop is carried by a transverse upright 82 that forms a part of the face plate 44. Further movement of the cylinder 76 and member 79 to the right will cause the head 80 to move the stop 81 and the face plate 44 to the right. The longitudinal movement of the face plate will cause the supporting rods 66 to swing in a counterclockwise direction and to lift the plate from the molded material during this movement. It will therefore be seen that the same master control cylinder will first rotate the shafts 52 and 53 to move the side plates and then will cause the head 80 to contact the stop 81 to move the face plate. A return movement of the cylinder will initially return the side plates to their starting positions and will cause the head 80 to strike a second stop 83 also carried by the face plate 44 and to return the face plate to its normal position where it will contact with the tops of the side plates 45 and 46. The end plate supporting frame members 69 also carry a stationary end plate 84, see Figure 10, through the medium of threaded rods 85, see Figure 4, that are adjustably mounted on the members 69.

When the face plate 44 is in normal position, it will rest on the end plate 84 as clearly shown in Figure 10. Both Figures 10 and 11 illustrate how the jaw guiding cylinder 38 is pivoted to the frame 44 at 42. Only the cylinder 38 and the pivot 42 are illustrated in this figure.

*Angle adjusting arms for side members*

Figure 18:
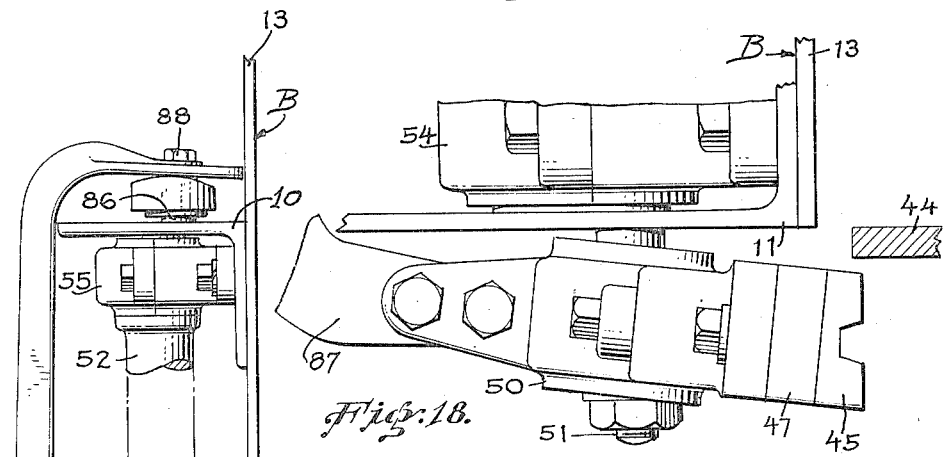
Figure 18 is a side elevation of the bearing shown in Figure 17, the bearing side plate being inclined at a slightly different angle.
Figure 19:
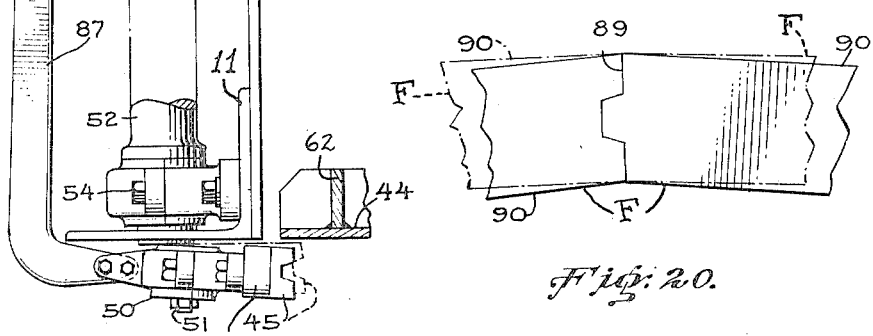
Figure 19 is a side elevation of the angle adjusting arms for the side plates.

The angle adjusting arms for the side members are shown in detail in Figures 17 to 19, inclusive. The shaft 52 in Figure 19 not only has the eccentric depending portion 51 but has an eccentric upstanding portion 86. The axes of the eccentrics 51 and 86 are in alignment with each other. The outer casing of the self-aligning bearing 50 that carries the side plate 45 is clamped to an angle adjusting arm 87 that extends from the self-aligning bearing 50 to the eccentric 86. The top of the arm is slitted and receives a cap screw 88 that adjustably connects the upper end of the arm to the eccentric.

Figure 20:
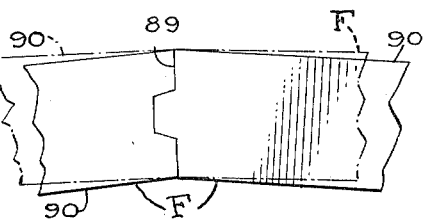
Figure 20 illustrates two different angles of the sides of the concrete staves.

Figures 17 and 18 illustrate how the angle adjusting arm 87 can be moved at its upper end for swinging the outer casing of the self-aligning bearing into the desired angular position and for swinging the side plate 45 therewith. The extent of movement is indicated in Figure 19 where two positions of the side member 45 are illustrated. When the angles of the side members 45 and 46 are altered in this manner, the angle of the edge 89 of the concrete stave 90, see Figure 20, is changed. The same figure indicates how the change of angle will cause two adjacent staves to extend at a different angle with respect to each other. In this way the diameter of the silo which is built by the staves can be changed. When the side plates 45 and 46 are lowered as shown in Figure 19, due to the changing of the angle, the face plate 44 is also lowered by altering the lengths of the adjusting rods 66. When the side plates 45 are in closed position, the face plate 44 must contact them.

*Operation*

In Figures 1 and 2, a hopper indicated generally at G is shown placed in a position for feeding concrete to the mold when the mold is swung into the vertical position of Figure 2. While the mold is in a horizontal position, a pallet board D is fed to the platform 23 by the intermittent chain conveyor 21. The conveyor will remain at rest during the time the pallet is lifted to form the underside of the mold and during the tilting of the mold into a vertical position to receive the concrete and the subsequent swinging of the mold back into a horizontal position. The operation of the pallet board feeding means C can be controlled automatically or by manually actuated hydraulic means, neither being shown.

After the piston rod 22 raises the pallet board into the dotted line position of Figure 1, the operator swings the handle 91 of the jaw control valve H to "close" position, see Figure 9. This will cause fluid under pressure to flow from the pump J, see Figure 6A, through the pipe 92, the valve H, through the conduit 93 to the cylinder 38 for causing the piston rod 40 to swing the lever 34 from the position shown in Figure 6 into that shown in Figure 12. The fluid in the cylinder 39 will flow through the conduit 94 back through the valve H and to the return pipe 95 that conveys the fluid back to the pump.

The swinging of the lever 34 into a horizontal position will cause the jaws 24 and 25 to grip the pallet board and hold it against the side plates 45 and 46 as indicated in Figure 12. The turnbuckles 33 and 37 will be in line with the lever as shown in the same figure and no strain will therefore be placed on the piston rod 40 to maintain the jaws in closed position. The pallet board now becomes a part of the mold and will remain so during the filling of the mold with concrete.

The operator now swings the mold from the horizontal into a vertical position after lowering the platform 23. The valve K in Figure 9 is used for this purpose and the handle 96 of this valve is swung into "raise" position. Fluid under pressure will flow through the conduit 97 to the cylinder 19, see Figure 2, and will cause the piston rod 17 to swing the lever 16 and the mold carrying frame B from the position shown in Figure 3 into that shown in Figure 2. The fluid in the cylinder 20 will flow back through the conduit 98 to the valve K. The valve K is connected to the pipe lines 92 and 95 in the same manner as the valve H.

The mold is filled with concrete from the hopper G and the concrete can be tamped in the mold by any means, not shown. When the mold is filled, the top is scraped off and then the handle 96 of the valve K is swung into "lower" position. The fluid under pressure will now flow through the line 98 to the cylinder 20 to cause the piston rod 18 to return the mold to horizontal position. The fluid in the cylinder 19 will return to the valve K through the line 97.

The operator opens the top and side plates of the mold to permit the concrete stave to rest on the pallet board. The handle 99 of the valve L, see Figure 9, is swung into "rear" position, and fluid will flow through a conduit 100 to the cylinder 76 and cause the fixed piston 75 to move the cylinder from the position shown in Figure 10 into that shown in Figure 11. As already stated, the initial movement of the cylinder will cause the pivot rod 77 to move the racks 58 and 59 rearwardly, see Figures 7 and 8, for rotating the pinions 56 and 57 and freeing the side plates 45 and 46 from the concrete stave. The side plates give a troweling action to the stave sides during their opening movement. If desired the plate 45 may have a longitudinal groove therein and the plate 46 a longitudinal rib.

After the cylinder 76 has moved a predetermined distance to the right in Figure 10, the head 80 will contact the stop 81 and move the top plate 44 rearwardly. Since the top plate is suspended by four swinging arms 66, the plate will be raised off from the stave upper surface during its rearward movement. A troweling action of the top plate over the stave will therefore result.

While the top and side plates remain in open position, the platform 23 is raised to contact the pallet board and then the handle 91 of the valve K is swung into "open" position for causing fluid to flow through the line 94 to the cylinder 39 and force the piston rod 41 to swing the lever 34 and the jaws 24 and 25 into open position. The platform 23 with the pallet board D and the molded stave F is now lowered until the pallet board rests on the conveyor 21.

Before the next pallet board is raised to be gripped by the jaws, the handle 99 of the valve L is swung into for'd position, standing for "forward." Fluid will flow through the conduit 101 from the valve L to the left hand end of the cylinder 76, shown in Figure 11 and will force the cylinder back into the position shown in Figure 10. The top and side mold plates will be returned to closed position and the parts will be ready for the next molding operation.

I claim:

1. In a device of the type described, a mold having a top plate, and side plates, a pallet board constituting a lower plate of the mold, clamping and supporting means for holding the board against the side plates, said means including board gripping jaws, levers carrying the jaws at one end, a second lever placed between the opposite ends of the first-named levers and rotatable about a fixed pivot, and links interconnecting the ends of the second lever with the adjacent ends of the first-named levers for causing the latter to swing the jaws into a position for holding the board against the side plates when the links and second lever are substantially in alignment with each other, whereby the second lever and links are arranged on a dead center line and will resist any tendency for the jaws to open.

2. In a device of the type described, a mold carrying frame, a top mold plate, and side plates, eccentrics connected to the side plates for moving them in the same longitudinal direction and away from each other when the eccentrics are rotated in a predetermined direction, pinions connected to the eccentrics, racks meshing with the pinions, and means for moving the racks in one direction for causing the side plates to move away from each other, arms swingably supporting the top plate, said rack moving means including delayed means for moving the top plate after the side plates have moved a predetermined distance, the arms swinging about fixed centers for causing the top plate to swing through an arc when moved.

3. In a device of the type described, a mold carrying frame, a top mold plate, and side plates, eccentrics connected to the side plates for moving them in the same longitudinal direction and away from each other when the eccentrics are rotated in a predetermined direction, pinions connected to the eccentrics, racks meshing with the pinions, and means for moving the racks in one direction for causing the side plates to move away from each other, arms swingably supporting the top plate, said rack moving means including delayed means for moving the top plate after the side plates have moved a predetermined distance, the arms swinging about fixed centers for causing the top plate to swing through an arc when moved, said rack moving means being adapted to move the racks in the opposite direction for moving the side plates into closed position and for causing the delayed means to move the top plate into closed position.

4. In a device of the type described, side plates for a mold, eccentrics for moving the side plates toward or away from each other and including self-aligning bearings, shafts carrying the eccentrics and the bearings and having similar eccentrics mounted on their other ends, and levers pivotally secured to the bearings and supporting the side plates, the other ends of the levers being adjustably secured to the second-named eccentrics, whereby an adjustment of the levers to the second-named eccentrics will swing the side plates into an angular position about their longitudinal axes.

PAUL D. NELSON.

REFERENCES CITED

The following references are of record in the file of this patent:

UNITED STATES PATENTS

| Number | Name | Date |
|---|---|---|
| 1,096,905 | Griffith | May 19, 1914 |
| 1,100,452 | Stehm | June 16, 1914 |
| 1,113,957 | Covault et al. | Oct. 20, 1914 |
| 1,593,295 | Erickson et al. | July 20, 1926 |
| 1,721,017 | Gurney et al. | July 16, 1929 |
| 1,808,860 | Nelson | June 9, 1931 |

FOREIGN PATENTS

| Number | Country | Date |
|---|---|---|
| 426,397 | France | July 5, 1911 |